LEVER MEANS, BETWEEN PROTECTION MEANS AND SWITCH CONTACTS FOR PREVENTING RESETTING OF OPERATING MACHANISM IF CONTACTS ARE WELDED SHUT

Original Filed Sept. 20, 1965 5 Sheets-Sheet 1

INVENTORS
ROBERT E. WALTERS
GERD C. BOYSEN
BY Richard C. Steinmetz Jr.
ATTORNEY

LEVER MEANS, BETWEEN PROTECTION MEANS AND SWITCH CONTACTS FOR PREVENTING RESETTING OF OPERATING MACHANISM IF CONTACTS ARE WELDED SHUT

Original Filed Sept. 20, 1965 5 Sheets-Sheet 2

INVENTORS
ROBERT E. WALTERS
GERD C. BOYSEN
BY Richard C. Steinmetz Jr.
ATTORNEY

Nov. 3, 1970 R. E. WALTERS ET AL 3,538,477

LEVER MEANS, BETWEEN PROTECTION MEANS AND SWITCH CONTACTS FOR PREVENTING RESETTING OF OPERATING MACHANISM IF CONTACTS ARE WELDED SHUT

Original Filed Sept. 20, 1965

INVENTORS
ROBERT E. WALTERS
GERD.C. BOYSEN

BY Richard C. Stummer Jr.
ATTORNEY

LEVER MEANS, BETWEEN PROTECTION MEANS AND SWITCH CONTACTS FOR PREVENTING RESETTING OF OPERATING MACHANISM IF CONTACTS ARE WELDED SHUT

Original Filed Sept. 20, 1965

INVENTORS
ROBERT E. WALTERS
GERD C. BOYSEN
BY Richard C Steinmetz Jr.
ATTORNEY

Nov. 3, 1970 R. E. WALTERS ET AL 3,538,477

LEVER MEANS, BETWEEN PROTECTION MEANS AND SWITCH CONTACTS FOR PREVENTING RESETTING OF OPERATING MACHANISM IF CONTACTS ARE WELDED SHUT

Original Filed Sept. 20, 1965 5 Sheets-Sheet 5

INVENTORS
ROBERT E. WALTERS
GERD C. BOYSEN
BY Richard C Steinmetz Jr.
ATTORNEY 3,538,477

LEVER MEANS, BETWEEN PROTECTION MEANS AND SWITCH CONTACTS, FOR PREVENTING RESETTING OF OPERATING MECHANISM IF CONTACTS ARE WELDED SHUT

Robert E. Walters, Bayside, and Gerd C. Boysen, Milwaukee, Wis., assignors to Allen-Bradley Company, Milwaukee, Wis., a corporation of Wisconsin Original application Sept. 20, 1965, Ser. No. 488,548, now Patent No. 3,430,014, dated Feb. 25, 1969. Divided and this application Aug. 2, 1968, Ser. No. 749,751

Int. Cl. H01h *71/62, 71/14*

U.S. Cl. 337—74 3 Claims

ABSTRACT OF THE DISCLOSURE

Mechanism for an electric switch which includes a lever transmitting motion between switch protection means and movable contacts of the switch. The electric switch also includes lock means which respond to the position of the removable contacts in order to permit motion of the lever in response to selected positions of the movable contacts.

This is a division of application Ser. No. 488,548, filed Sept. 20, 1965, now Pat. No. 3,430,014.

This invention pertains to an electric switch and more particularly a snap-action, manually operated electric switch.

Customer requirements and other factors have resulted in electric switches which are extremely complex. Consequently, assembly and disassembly of the switches other than by the factory has become almost prohibitive. The invention described herein not only satisfies the customer operating requirements, but accomplishes this end with a construction which is simple and conducive to assembly and disassembly.

Such construction is achieved through a switching unit comprising two components, viz a base unit with fixed contacts and provision for condition sensitive protection, if desired, and a movable contact carrier, which switching unit can be adapted to a variety of operating mechanisms. Furthermore, the switching unit is so designed that varying sized switching units will accommodate a common operating mechanism. Thus, the switching unit with its mechanism can be considered made of modules permitting far more versatility in the manufacturing, sale and use of the electric switch of the invention than previously known.

In the manufacturing step, for example, it is possible to assemble each module independently and then bring them together for final assembly, which approach represents the most efficient manufacturing method. Sales wise, it is possible to meet the customers' varied switch unit requirements without the need for a separate operating mechanism for each required combination. Once in use, a switch which is made from component units or modules and can be disassembled while remaining as integral units saves considerably reduced time and effort on the part of the user.

Size, particularly reduced size, is a consideration of major importance in an electric switch. Also, an electric switch must anticipate the many fault conditions which may arise under operating conditions. The switch of this invention takes both of these factors into consideration with significant improvements.

It is another object of this invention to provide an electric switch which is simple, yet adaptable to various operating mechanisms.

It is a still further object of this invention to provide a simple, yet effective fault responsive mechanism in an electric switch with condition responsive means.

It is a still further object of this invention to provide a simple, yet positive securing and blocking mechanism for the contact carrier of an electric switch.

It is a still further object of this invention to provide trip free operation in an electric switch, i.e. the inability to close the switch when selected conditions exist such as over-current in the switched circuit.

These and other objects will become more apparent from the following description of an illustrative form of the invention. While the invention is not so limited, the drawings and the detailed description with respect thereto are set forth in order for a better understanding of the invention. The reader is referred to the appended claims where the scope of the invention is set forth.

Figures 4, 5:
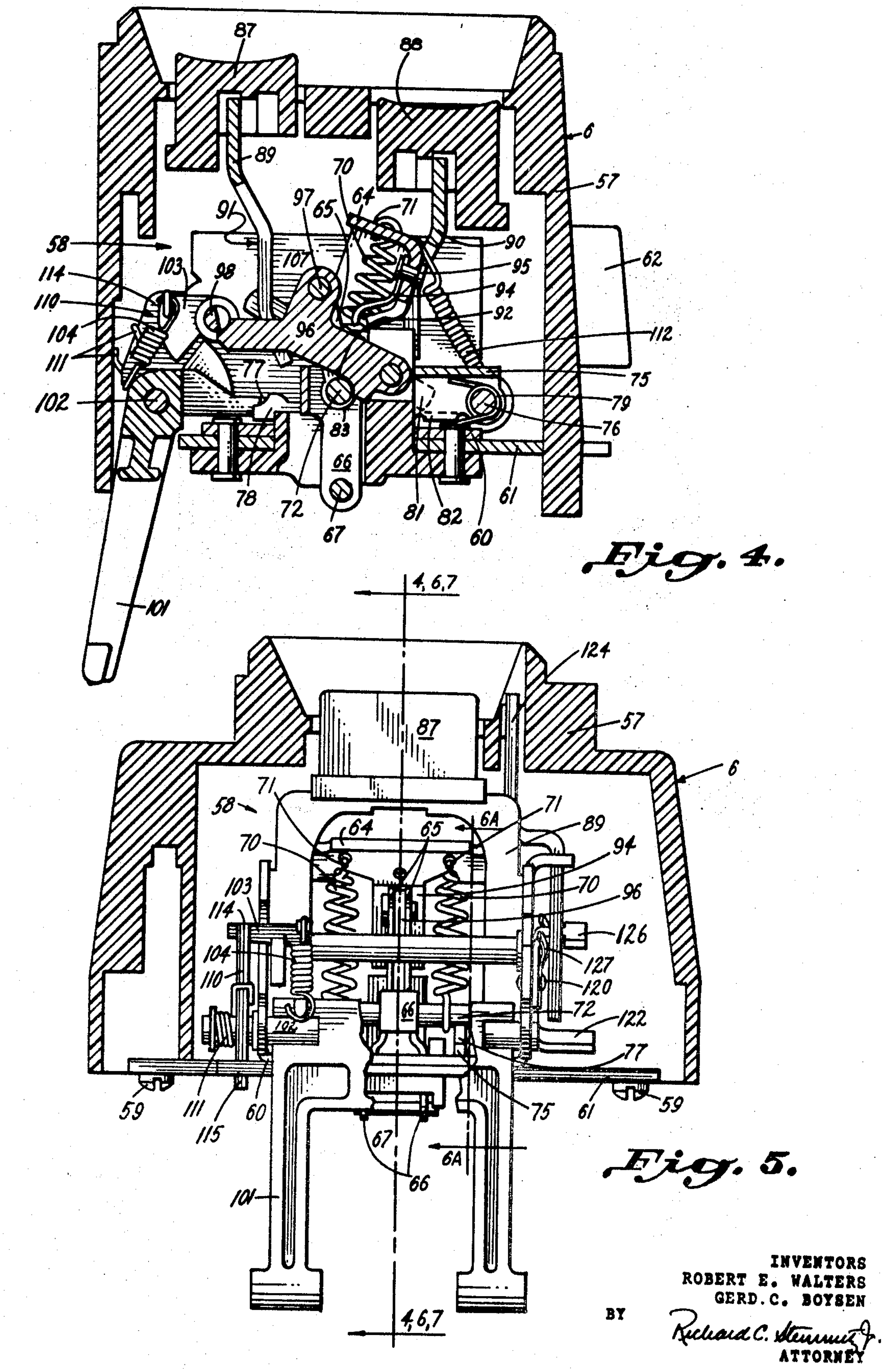
FIG. 4 is a cross-sectional, side view of a particular mechanism and its housing taken along the lines 4—4 of FIG. 5. The mechanism is shown in an extended position usually associated with a closed contact condition.
FIG. 5 is a cross-sectional, end view of the mechanism set forth in FIG. 4.
Figures 6, 6A, 7:
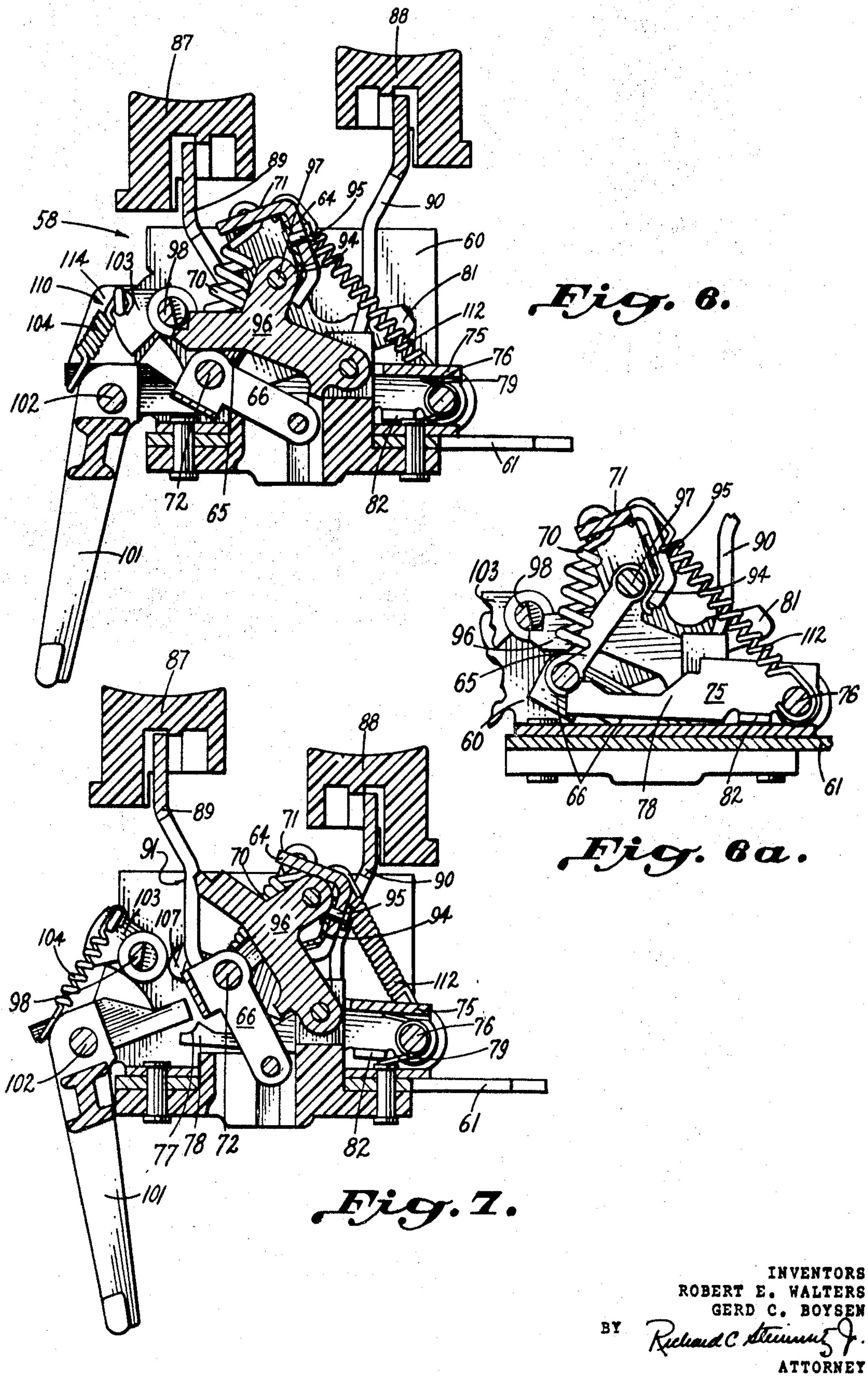
FIG. 6 is a cross-sectional, side view of the mechanism set forth in FIG. 4 and taken along line 6—6 of FIG. 5, but shown in a position normally associated with an open contact position.

FIG. 6*a* is a partial, cross-sectional side view taken along line *6a—6a* of FIG. 5.

FIG. 7 shows a cross-sectional, side view of the mechanism of FIG. 4 taken along line 7—7 of FIG. 5 and in a position normally associated with open contacts in response to a preselected condition, i.e. a tripped position.

Figure 8:
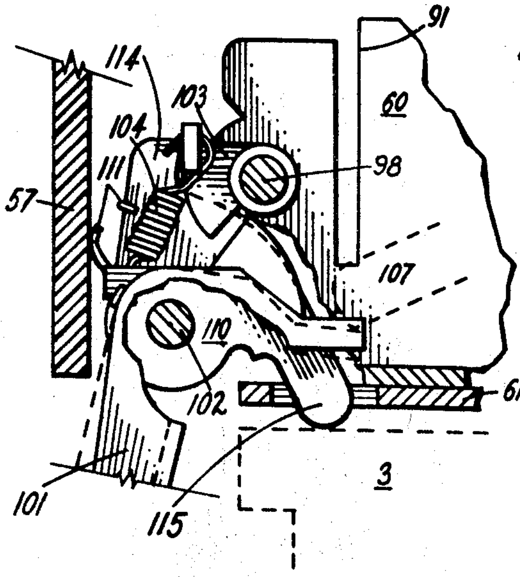

FIG. 8 is a partial, cut-away view of the mechanism in FIGS. 4–7 illustrating the parts thereof which prevent reset of the mechanism from its FIG. 7 position should certain fault conditions exist.

Figure 9:
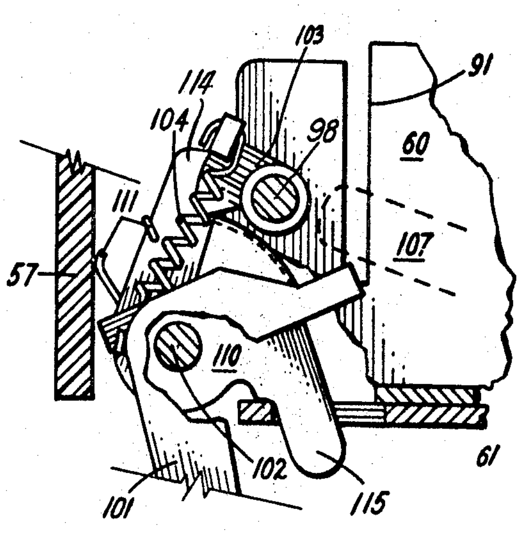

FIG. 9 shows the parts set forth in FIG. 8, but with the positioning of these parts should a fault condition exist during operation of condition sensing means such as an over-current delay.

Figure 2:
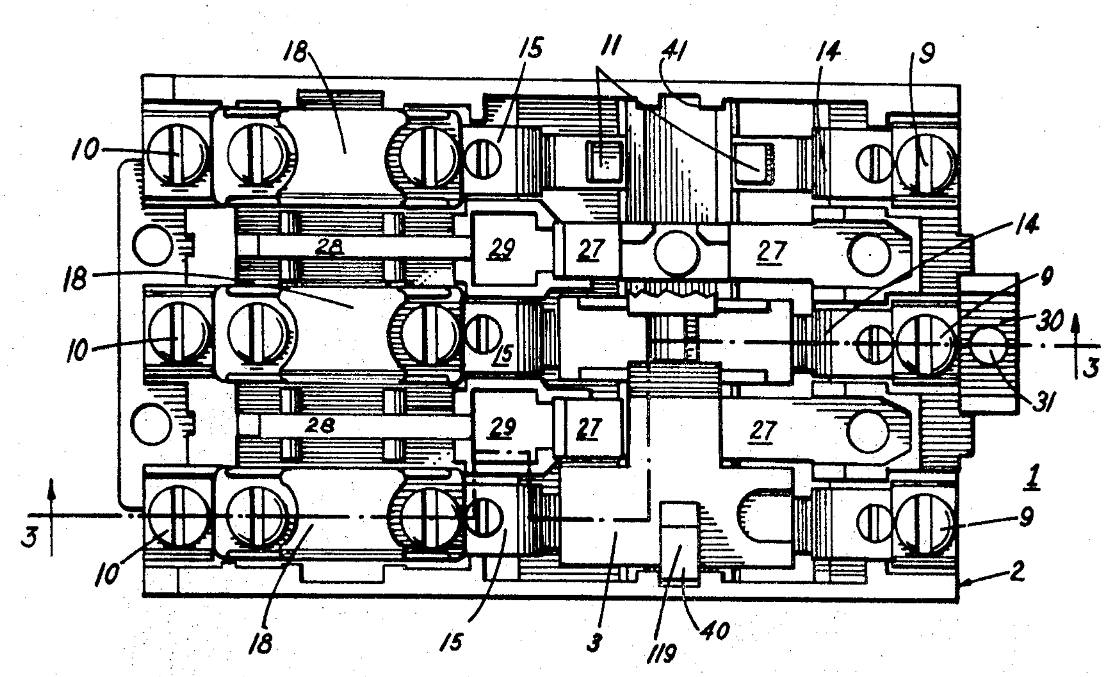
FIG. 2 is a cut-away top view of the switch unit.
Figure 3:
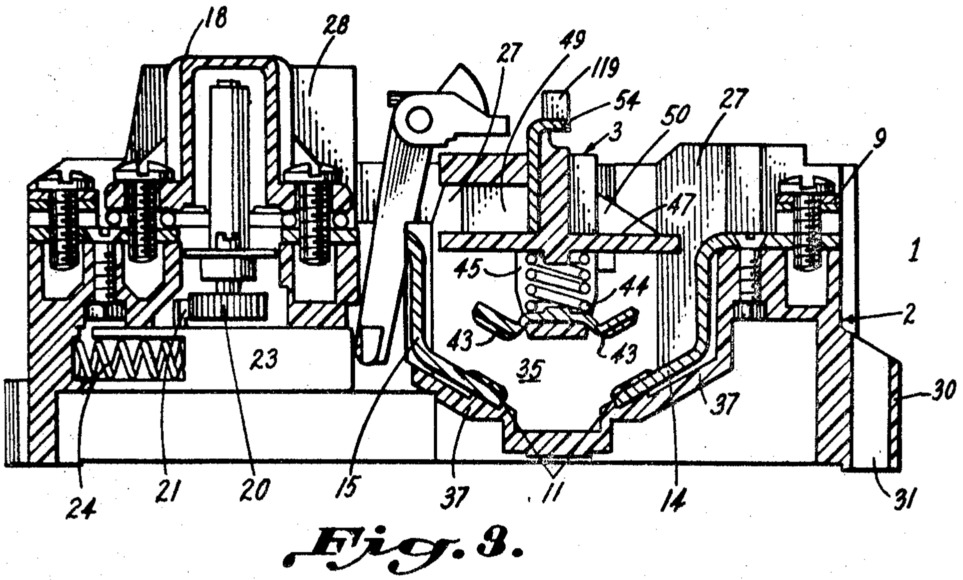
FIG. 3 is a cross-sectional, side view of the switch unit set forth in FIG. 2 taken along the line 3—3 of FIG. 2.
Figure 10:
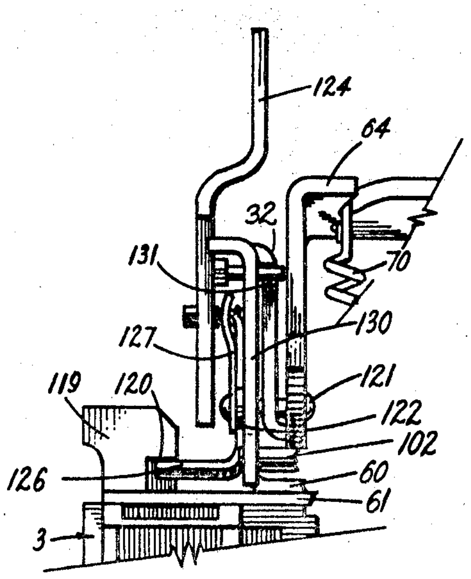

FIG. 10 is a partial, side view of the locking and securing mechanism used for the switch unit in FIGS. 2 and 3.

Figure 11:
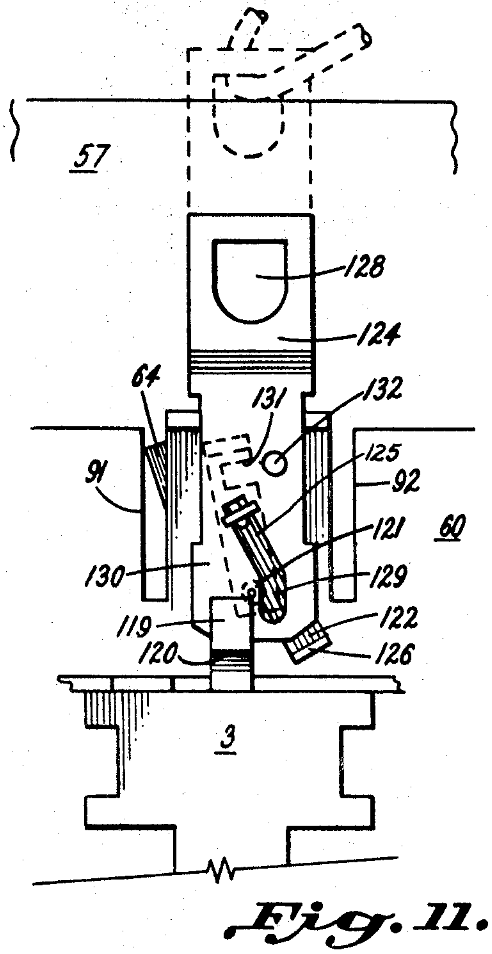

FIG. 11 is a partial, end view of the mechanism shown in FIG. 10.

Figure 1:
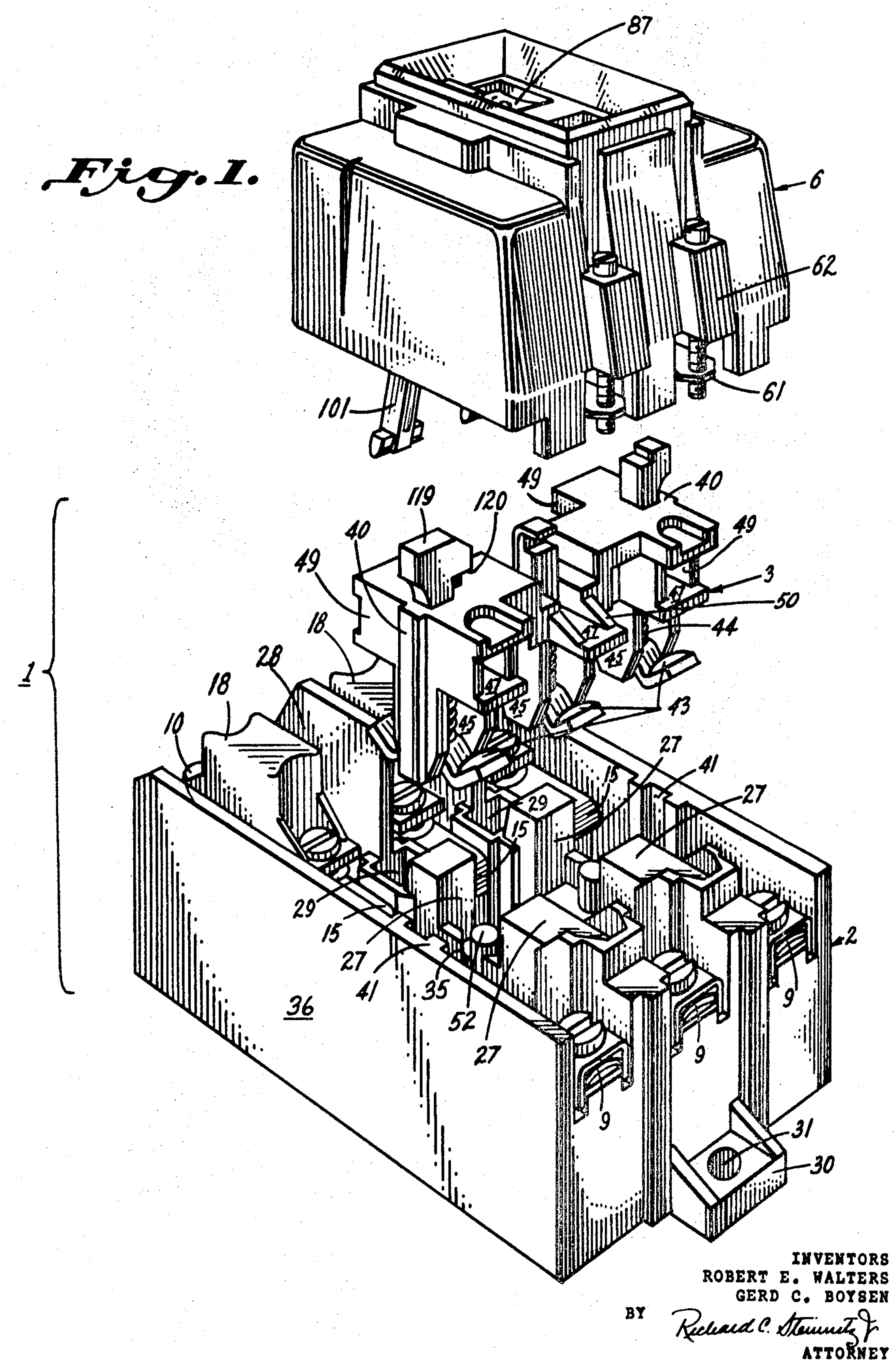
FIG. 1 is a perspective, exploded diagram of the switch making up the invention, illustrating the modular construction.

The modular concept of the electric switch of this invention is best illustrated by FIG. 1. Here, the switch unit 1 is made from a base 2 and a movable contact carrier 3. The operator 6, with its integral operating means to be described later, is a modular unit adaptable to the switch unit 1.

Within the base unit 2 is a provision for a number of current-carrying paths, herein illustrated by three such paths. Terminals 9 and 10 for external connection terminate either end of these current-carrying paths and are located at either end of the base 2. Fixed contacts 11 are connected on the one hand by way of current conductor 14 to terminal 9; while on the other hand by way of current conductor 15 and the condition sensitive unit (to be described hereinafter) to terminal 10. The condition sensitive units for protective purposes used in the embodiment of the drawings is best shown in FIG. 3 and comprises a well-known solder-pot, current over-current unit 18. In the conventional manner, an excessive current will liquefy a solder pot within the unit 18, thus releasing a held rotatable ratchet wheel 20.

FIG. 3 best shows the pawl arm 21 which transfers the releasing motion of the ratchet wheel 20 to the slide 23. Compression spring 24 biases the slide 23 to aid in the movement of slide 23.

Between each current conducting path in the base 2, i.e. that path between the terminals 9 and 10, are barrier means 27 which have a primary function to prevent any arc from moving between adjacent current-carrying paths. Each barrier 27 includes an extended portion 28 intermediate the condition sensitive, solder pot units 18 for shielding therebetween. Vertical openings 29 in the barriers 27 of base 2 (as best shown in FIGS. 1 and 2) permit access to the slide 23 so that motion thereof may be transmitted to the operator 6, to be described later. External to the base 2 are molded lugs 30 with apertures 31, which lugs 30 provide attachment means. The movable contact carrier 3 includes guide lugs 40 at either end which move within the guide track 41 molded in the base 2.

This movable contact carrier 3 completes the switch unit 1 as it fits within arc chambers 35 provided for each of the fixed contacts 11. Each arc chamber 35 is essentially an open topped chamber surrounded by molded portions of the base 2, viz, side walls 36 and transverse walls 37, in combination with the barrier walls 27.

Movable contacts 43 are retained within the contact carrier 3 by means of biasing springs 44. Each movable contact 43 is located within U-shaped molded pieces 45 which fit within each arc chamber 35 such that they are below the arc chamber closing walls or arc shields 47 of the carrier 3. Structural support for the walls 47 of the carrier 3 is provided at either end by the molded, cross-sectional box construction at 49 and by the triangular support construction at 50 for the intermediate movable contacts 43. The contact carrier 3 is movably biased to a normally open contact postion as shown in FIG. 3 by means of biasing springs shown herein with a cover portion 52.

An L-shaped hook 54 provides the connection between the movable contact 3 and the operator 6 as will be described later.

Utilizing a wall 47 of the movable contact carrier 3 to close the final wall of the arc chamber 35 provides a most efficient and expeditious construction with advantages such as hitherto unavailable compact construction and utilization of the switch unit 1 independent from the operator 6. Moreover, the particular construction of the operator 6 becomes less critical insofar as shielding is concerned because the movable wall 47 accomplishes this end.

Additional advantages in arc suppression characteristics within the arc chamber 35 may be had through the use of an arc quenching material such as the hot-molded arc-quenching Rosite material (viz, a water-insoluable binder and an arc-suppressing substance selected from the class consisting of the oxides and hydrates of aluminum and magnesium) manufactured by the Rostone Corporation of Lafayette, Ind. The unique construction of the arc chamber in combination with the use of an arc-quenching material for the spaced side walls 36, transverse walls 37 and/or arc chamber closing walls 47 of contact carrier 3 permit reduced switch size plus increased switch reliability and operating life.

Details of the operator 6 are set forth in FIGS. 4 through 7. This operator is an integral unit comprising a housing 57 and an operating mechanism 58, the latter being attached to the former by, for example, screws 59, to form this integral unit. This integral unit is attached as a unit to the switch unit 1 by fastening means which connect the modular units at the lugs 62 on housing 57 of operator 6.

The operating mechanism 58 is supported within a U-shaped piece 60 which, in turn, is supported upon the plate 61. A mechanism operator 64 is pivoted upon the U-piece 60 so as to move toggle links 65 and 66, the latter being attached to the contact carrier 3 through pin 67, i.e. the L-shaped hook 54 of the contact carrier engages pin 67. As is seen in FIG. 5, links 65 and 66 each take the form of twin links in this particular embodiment. Springs 70 connect the operator 64 at 71 with the toggle links 65 and 66 by means of pin 72 to establish a pivot point which is better known as the knee of the operating mechanism 58.

By moving the operator 64 to the left, as viewed in FIG. 4, a point is reached beyond which the net vectorial force of the springs 70 as applied to the knee 72 is sufficient to move the knee at 72 from the position of FIG. 4 to the position of FIG. 6. This position beyond which movement of the knee at 72 occurs is referred to as the "center position" since the net vectorial forces exerted by springs 70 upon the knee at 72 are substantially balanced.

With the use of sufficient spring force through springs 70, the movement of the knee at 72 will be a snap action, i.e. an unrestrained, quick movement from, for example, the position of FIG. 4 to that of FIG. 6. Because of this action, the movement of the knee at 72 is termed an over-center, snap action.

Reducing the size of this operating mechanism 58 without effecting performance characteristic is restricted in view of the force requirements in the springs 70. However, by this invention, it is now possible to design a smaller mechanism utilizing smaller spring or springs 70 based upon the springs 70 utilizing their maximum available force, viz, effecting snap action of the knee at 72 when the operator 64 has moved substantially beyond the center position. This result is accomplished through the use of lever 75.

As more clearly shown in FIG. *6a*, the lever 75 is pivoted at one end about pin 76 and has a cammed surface 77 at the other end. The specific lever 75 shown in the drawings is a bifurcated piece with two arms 78 and therefor two cammed surfaces 77. Torsion spring 79 located about the pin 76 encourages the lever 75 in a direction toward the operating mechanism 58.

This biased upward movement of the lever 75 brings the cammed surfaces 77 in contact with the pin 72, i.e. the knee, when the switch is in the position of FIG. 6. This cammed surface 77 is so designed that when the operator 64 moves from the position of FIG. 4 to that of FIG. 6, the knee at 72 will not move when the operator 64 moves immediately beyond the center position. Instead, at a selected position between the center position and the final rest position of the operator 64, the net vectorial force of spring 70 will overcome the opposing or holding force of the cammed surface 77 to thereby release the knee at 72 for the desired snap-action. Thus, the same required spring force necessary for switch unit operation has been supplied, but with the use of springs 70 smaller than a mechanism without the restraining force of cammed surfaces 77 and, consequently, a smaller mechanism 58.

In the position of FIG. 4, the upward motion of the lever 75 is restrained by abutment between the extended arm portion 81 of lever 64 and protruding lug 82 extending out from the lever 75. This abutment between arm 81 and lug 82 also serves to stop the motion of the mechanism 58 when traveling from the FIG. 6 to the FIG. 4 position. Likewise, abutment between the pin 72 and the trip lever 96 at 83 stops the same motion of mechanism 58. Conversely, the abutment between arm extension 107 of operator 64 (see FIG. 8) stops the motion of mechanism 58 as it moves to the position of FIG. 6 from the positions of FIGS. 4 or 7.

The use of push buttons (as opposed to a reciprocal lever which would be attached to the operator 74) is illustrated in FIG. 4. Here, push buttons 87 and 88 are operatively connected to the operator 64 by way of bifurcated connectors 89 and 90, respectively. Motion of the connectors 89 and 90 is guided in the slots 91 and 92 of the U piece 60.

Utilizing the operator 6 as set forth in FIGS. 4 through 7 for the switch unit 1, the position of the mechanism 58 in FIG. 4 would reflect the On or closed position between the movable contacts 43 and the fixed contacts 11 since the toggle links 65 and 66 are extended so as to move the contact carrier 3 in a downward or extended position. Conversely, the operating mechanism 58 as shown in FIG. 6 reflects the Off or contact open position of the movable contacts 43 and the fixed contacts 11 since the toggle links 65 and 66 are in a retracted position.

Should springs 70 fail when the operating mechanism moves to the On position, herein FIG. 4, it is advantageous that the mechanism nevertheless be movable to the Off position, herein FIG. 6. This end is achieved as spring member 94, affixed to the operator 64 at 95, abuts the link 65 as the operator 64 is moved from the On position. Link 65 thereby moves the pin 72 or knee toward its retracted position of FIG. 6.

Springs inherent in a switching unit supply the remaining force necessary to complete this movement of the knee at 72. For example, the springs 52 in the base 2 which have been compressed by the closing movement of contact carrier 3 and the contact springs 44 which likewise have been closed by contact closing would supply the remaining necessary force to achieve the position of FIG. 6.

The mechanism 58 as shown in FIGS. 4–7, further aids the contact opening should springs 70 fail by locating the knee at 72 beyond the over-center position in a partially retracted position during the On position (FIG. 4). Therefore, before the knee at 72 can move to the retracted position of FIG. 6, it must first go through an extended position which will necessarily further compress the springs 44 and 52. This added potential energy insures return of the knee at 72 to the FIG. 6 position.

It may also be desired that the operating mechanism 58 respond to the slide 23 of the switch unit 1 when predetermined conditions exist. In particular, it may be desired, in the switch unit 1 depicted by the drawings, to separate the contacts 43 and fixed contacts 11 when certain overload conditions exist in the circuit to which the switch unit 1 is connected, i.e. move the contact carrier 3 by means of toggle links 65 and 66 from their extended position of FIG. 4 to the retracted position of FIG. 7 in response to the released rotational movement of the ratchet wheel 20 in overload unit 18. This retraction of the movable contact carrier 3 is accomplished through the movement of the trip lever 96 which is pivoted on pin 97 (attached then to the operator housing 57) and is pivotally connected to the toggle link 65 at 98.

It can be seen from FIG. 4, that movement of the trip lever 96 toward the operator 64 about pin 97 will retract the toggle links 65 and 66. This end is accomplished by releasing the trip lever 96 from its restrain position of FIG. 4 with the rotation of trip pin 98. Once the trip pin 98 is rotated to free the trip lever 96, the extended tension springs 70 are sufficient to retract the toggle links 65 and 66 at pin 72 and pull the trip lever 96 into the position of FIG. 7.

The rotation of trip pin 98 is in response to movement of the slide 23 which, in turn, pivots the relay actuator 101 upon its pivot pin 102. The motion of relay actuator 101 is transferred to the trip pin 98 through an extension of the latter in the form of trip pin arm 103. Tension spring 104 biases the trip pin arm 103 with respect to the relay actuator 101 to aid in the reset operation as will be described hereinafter.

The resetting sequence for the mechanism 58, i.e. moving the mechanism 58 from the position of FIG. 7 to that of FIG. 6, also resets the overload unit 18 as the slide 23 returns back to the position of FIG. 3. The common reset action is begun through movement of the operator 64 so as to pivot the trip lever 96 about the pivot point 97. It is noted that in resetting the mechanism 58, the portion of the trip lever 96 which is to be restrained by contact with the trip pin 98, be moved past its position of FIG. 6 before the trip pin 98 completes its rotation to the restraining position of FIG. 6.

The common reset action of the trip pin 98 and actuater 101 is completed with the abutment between the arm extension 107 of operator 64 and the relay actuator 101. This abutment relationship between the arm 107 and relay actuator 101 is illustrated in FIG. 9 which shows the operator 64 as it nears its position of FIG. 6 to begin reset and rotation of trip pin 98 without the latter interfering with the passage of trip lever 96 thereby. Thus, the reset of mechanism 58 is effected by the return of the trip pin 98 to its restraining position of FIG. 6 as the relay actuator 101 is pivoted in a clockwise direction upon pin 102 (as viewed in FIG. 7) permitting the tension spring 104 to pull the trip pin arm 103 and, consequently, trip pin 98 along until the FIG. 6 position is reached. At the same time, the clockwise motion of the relay actuator 101 returns the slide 23 to its position of FIG. 3 to thereby reset the conditon sensitive portion, i.e. overcurrent unit 18.

Should springs 70 fail in the position of FIG. 4, it is most important that the mechanism 58 nevertheless operate to move the contact carrier 3 to the contact open position of FIG. 3 when trip lever 96 is released from its restrained position in FIG. 4. As is described above in connection with moving the mechanism 58 to the position of FIG. 6 from FIG. 4 should springs 70 fail in the former position, the same action through spring 94 in operator 64 and springs 52 and 44 in the switch unit 1 accomplish the movement to FIG. 7 from FIG. 4 under these same adverse conditions.

For various reasons, the movable contact carrier 3 may remain in a contact closed position, i.e. the movable contacts 43 engaging the fixed contacts of 11, after slide 23 has moved the relay actuator 101 so as to release the trip lever 96. Since it is undesirable to reset the operating mechanism 58 under such conditions, a locking device has been incorporated.

Freely pivoted upon the pin 102, which carries the relay actuator 101, is trip lock lever 110. A spring 111 biases the trip lock lever 110 toward the trip pin arm 103 at one end so that the tab 114 abuts the trip pin arm 103. Another portion of trip lock lever 110 extends through the support plate 61 as finger 115. The relationship and operation of the relay actuator 101, the trip pin arm 103 and trip pin 98 with the trip lock lever 110 is illustrated in FIGS. 8 and 9.

FIG. 8 shows the relationship when the operating mechanism 58 is in the position of FIGS. 4 and 6, viz, the tab 114 of trip lock lever 110 abuts the trip pin arm 103 so as to prevent a clockwise rotation of the trip lock lever 110 and contact between the finger 115 and the movable contact carrier 3. The uppermost position of contact carrier 3 is shown in FIGS. 8 and 9. When the operating mechanism 58 is tripped and the position of FIG. 7 assumed, the trip pin arm 103 is rotated clockwise as shown in FIG. 9 freeing the trip lock lever 110 to move clockwise. This clockwise motion of trip lock lever 110 is limited by its abutment with the support plate 61 which brings the tab 114 into line with the previously abutted portion of the trip pin arm 103 and thereby blocks any counterclockwise or reset motion of the trip pin arm 103. With the trip pin arm 103 blocked, the tension spring 104 is unable to pull the trip pin arm and attached trip pin 98 to a position so as to restrain trip lever 96 when the arm extension 107 of operator 64 rotates relay actuator 101 in its counterclockwise, resetting motion. Tension springs 112, attached between the operator 64 and pin 76, aid in returning the operator 64 back to the position of FIG. 7 should the trip lock lever 110 prevent reset of the operating mechanism 58.

The trip lock lever 110 can be removed from this blocking position only if the movable contact carrier 3 returns to its normal open position as shown in FIG. 3 and schematically in FIGS. 8 and 9 to thereby abut finger 115 and rotate the trip lock lever 110 in a counterclockwise direction as viewed in FIG. 9. Thus, resetting of the operating mechanism 58 is not possible when the movable contacts 43 and fixed contacts 11 remain closed.

It is also important that the contact carrier 3 be locked in its upward or contact open position. As best shown in FIGS. 5, 10 and 11, the contact carrier 3 includes lug 119 with detent 120. Pivoted at 121 on the U piece 60 is the lock arm 122 which engages detent 120 for retaining the contact carrier 3 in the position shown. Extension lock arm 124 includes slot 125 in which finger 126 of lock arm 122 slides. The slot 125 is so designed that reciprocal motion of the extension lock arm 124 will cause the lock arm 122 to pivot about 121, i.e. move the lock arm into and out of the locking position with respect to the detent 120. Flat spring 127 located between pivoted lock arm 122 and extension lock arm 124 maintains the spacing therebetween and creates sufficient friction therebetween to maintain selected positions of said arms.

It is important to note that this structure, used to retain a contact carrier 3 in an open position, achieves this end through movement of the integral locking mechanism, viz lock arm 122 and extension lock arm 124. Additional locking through the use of independent means such as a padlock passed through the aperture 128—when the lock arm is in position shown by dotted lines in FIG. 11—serve to secure the already locked switch, contrary to the usual operation which requires the use of external padlock through the aperature 128 for locking. This feature means that the operator can accomplish the locking function when he so intends and not during that most dangerous time interval during which the operator searches for the padlock. Various sized independent securing means may be accommodated through the addition to the slot 125 of the slot portion 129 which extends substantially parallel to the reciprocal motion of extension lock arm 124.

When detent 120 of contact carrier 3 is not available for locking, i.e. in a position other than that shown in FIGS. 10 and 11, movement of lock arm 122 toward a locking position may abut the lug 119 of the contact carrier 3 with detrimental operation results. To prevent against such abutment, interlock 130 with notch 131 is pivotally mounted on pivot 121 so as to intercept pin 132 of extension lock arm 124. Finger 133 on interlock 130 connects the operator 64 with the interlock 130. Thus, as operator 64 moves clockwise (FIG. 11) to displace contact carrier 3 from the position of FIGS. 10 and 11, interlock 130 is also moved until notch 131 intercepts pin 132 to prevent locking movement of extension lock arm 124. This inability to move the extension arm 124 not only prevents faulty operation, but also suggests to the operator that the contact carrier 3 is not in its uppermost or contact open position.

We claim:

1. In an electric switch, (a) first and second contact means movable with respect to one another,
(b) contact carrier means for at least one said contact means,
(c) protection means which respond to selected conditions,
(d) lever means connecting said protection means and said contact carrier means to transmit motion therebetween,
(e) restraining means to hold said lever means in a restrained position,
(f) independent lock means responsive to the position of said contact carrier so as to,
  (1) move to a first position upon movement of the lever means from said restrained position, which first position prevents the restraining means from holding said lever means in said restrained position, and
  (2) permit said restraining means to re-establish said restrained position only when said contact carrier is in a selected position.

2. In the electric switch of claim 1,
(a) said restraining means including a pivoted arm means,
(b) said lever means abutting said pivoted arm means for movement thereof when said lever is moved from said restrained position,
(c) biasing means urging said pivoted arm means against said lever means,
(d) said independent lock means pivoted to block said arm means in said first position, and
(e) said independent lock means including finger means which project into the path of said contact carrier means so that the latter will contact and pivot said lock means out of said first position when said contact carrier means reaches said selected position.

3. In the electric switch of claim 2,
(a) operator means for said contact carrier means including trip means, and
(b) said trip means operable to move said carrier means to said selected position.

References Cited

UNITED STATES PATENTS

| | | | |
|---|---|---|---|
| 2,473,901 | 6/1949 | Pierce | 337—53 X |
| 2,607,867 | 8/1952 | Platz | 335—166 |
| 2,892,054 | 6/1959 | Walker et al. | 335—44 X |
| 3,240,904 | 3/1966 | Dowdle et al. | 337—53 |

ROBERT K. SCHAEFER, Primary Examiner

R. A. VANDERHYE, Assistant Examiner

U.S. Cl. X.R.

337—154; 335—166